(12) United States Patent
Miller et al.

(10) Patent No.: US 7,303,321 B2
(45) Date of Patent: Dec. 4, 2007

(54) TEMPORARY ASSEMBLY CLIP FOR SNAP-FIT GEAR BOXES

(75) Inventors: Bradley C. Miller, Machesney Park, IL (US); Karl R. Schmitt, Rockford, IL (US)

(73) Assignee: Acument Intellectual Properties, LLC, Troy, MI (US)

( * ) Notice: Subject to any disclaimer, the term of this patent is extended or adjusted under 35 U.S.C. 154(b) by 222 days.

(21) Appl. No.: 10/932,996

(22) Filed: Sep. 2, 2004

(65) Prior Publication Data
US 2005/0083708 A1 Apr. 21, 2005

Related U.S. Application Data

(60) Provisional application No. 60/511,974, filed on Oct. 16, 2003.

(51) Int. Cl.
*F21S 8/10* (2006.01)
(52) U.S. Cl. .................. 362/529; 362/460; 362/428
(58) Field of Classification Search ............. 362/523, 362/529, 526, 460, 524, 457, 458, 396, 427, 362/428, 285, 289, 429, 287, 418, 528, 273; 292/288, 291, 176; 248/544, 689, 292.12; 74/89.13

See application file for complete search history.

(56) References Cited

U.S. PATENT DOCUMENTS

| | | | | | |
|---|---|---|---|---|---|
| 1,319,393 A | * | 10/1919 | Hollis | .................. | 248/288.31 |
| 5,079,676 A | * | 1/1992 | Lisak | .......................... | 362/524 |
| 5,151,849 A | * | 9/1992 | Nagengast et al. | ......... | 362/461 |
| 5,539,625 A | * | 7/1996 | Turley et al. | ................ | 362/460 |

* cited by examiner

*Primary Examiner*—Sharon Payne
(74) *Attorney, Agent, or Firm*—Trexler, Bushnell, Giangiorgi, Blackstone & Marr, Ltd (57) ABSTRACT

A clip which is configured to keep a headlamp adjuster together during installation (and preferably also shipping), thereby allowing for one hand, easier installation. The clip can be left on the assembly after installation, or it can be removed, whichever is preferred. The clip is configured such that leaving it in place will not interfere with standard operation of the headlamp adjuster. A method of installing a headlamp adjuster with one hand is also provided.

22 Claims, 8 Drawing Sheets

TEMPORARY ASSEMBLY CLIP FOR SNAP-FIT GEAR BOXES

RELATED APPLICATION (PRIORITY CLAIM)

This application claims the benefit of U.S. Provisional Application Ser. No. 60/511,974, filed Oct. 16, 2003.

BACKGROUND

The present invention relates generally to headlamp adjusters (i.e., "gear boxes") which are used to adjust the position of a reflector of an automobile headlamp assembly, and relates more specifically to a temporary assembly clip for snap-fit headlamp adjusters.

Modern day headlamps for vehicles are engineered and designed to be aerodynamically efficient. In this regard, the headlamps are designed as sealed assemblies wherein the portion of the headlamp approximate the outer surface of the automobile is relatively stationary, and is aerodynamic.

Figure 1:
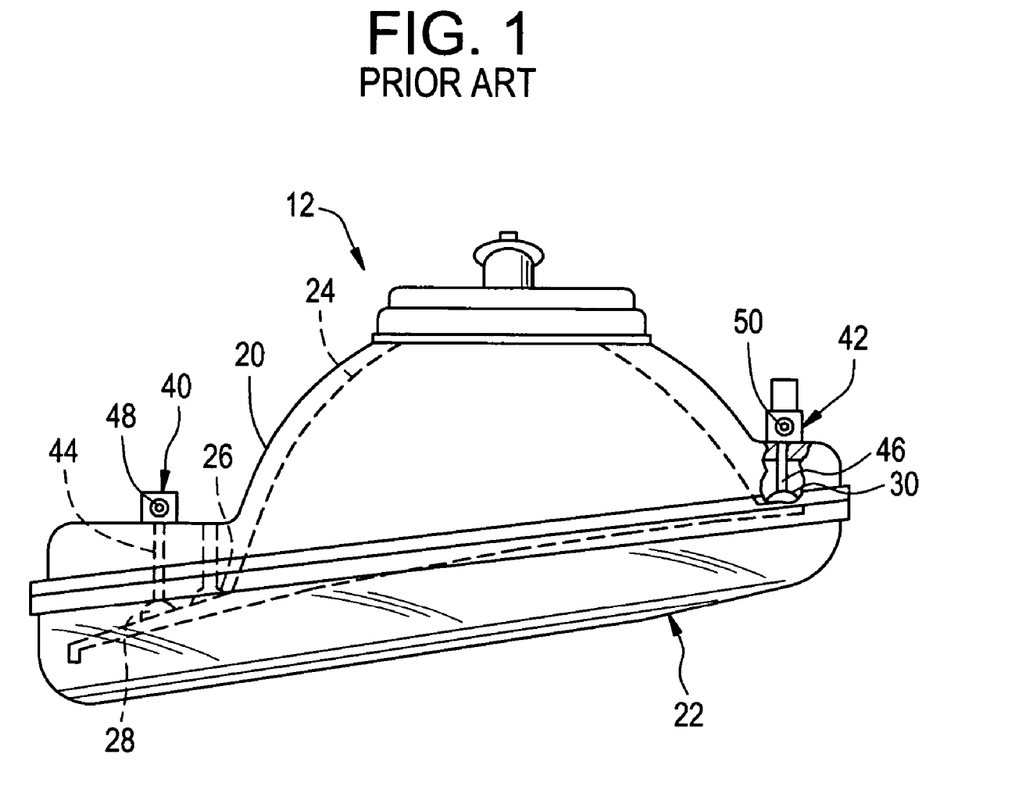
FIG. 1 is a plan view of a typical headlamp assembly.

A typical modern day headlamp assembly 12 is illustrated in a plan view seen as FIG. 1, and normally includes: a fixed housing 20, to which an outer headlamp lens 22 is affixed; a movable reflector 24, which is mounted within the fixed housing 20; and a stationary headlamp bulb (not shown), which is positioned within the movable reflector 24. Typically, the movable reflector 24 is mounted to the housing 20 by a universal or ball-type pivot 26 which is stationary, or fixed, on the housing 20.

A first pivot point 28 is disposed generally vertical of the fixed pivot 26, and a second pivot point 30 is disposed generally horizontal of the fixed pivot 26. As such, the movable reflector 24 may be pivoted about the fixed pivot 26 in the vertical and horizontal planes to aim the headlamp beam. Adjustment mechanisms, or headlamp adjusters, 40 and 42 are typically provided at the first and second pivot points, 28 and 30, normally termed the vertical pivot and the horizontal pivot, and the headlamp adjusters 40 and 42 can be operated to effect movement of the reflector 24 in the vertical and horizontal planes.

The headlamp adjusters 40 and 42 are typically mounted to the housing 20 of the headlamp assembly 12 and have adjuster output shafts 44, 46 operatively connected to the movable reflector 24 by ball and socket type pivots, or the like, such that linear movement of the adjuster output shafts 44, 46 produces pivoting of the movable reflector in the vertical and horizontal planes. Specifically, each headlamp adjuster 40, 42 typically includes drive structure 48, 50 for receiving a tool, and typically the drive structure 48, 50 is precision geared to the adjuster output shaft 44, 46. The gearing provides that using the tool to rotate the drive structure 48, 50 causes linear translation of the adjuster output shaft 44, 46 and therefore adjustment of the position of the headlamp reflector 24.

Before an automobile is released to the consumer, the movable reflectors of the headlamp assemblies are adjusted to a desired position so that the headlamp beams are properly aimed in both the vertical and horizontal directions. To this end, headlamp adjusters are normally operated at the automobile assembly plant. Thereafter, if a movable reflector moves from its desired position, due, for example, to vibration, jarring, or the vehicle being in an accident, a mechanic can operate the headlamp adjusters in order to properly re-align the reflectors.

Some headlamp adjusters are designed such that they mount to the housing 20 of the headlamp assembly 12 in a snap-fit arrangement. Typically, such a design is provided in two sections and requires two hands for installation.

OBJECTS AND SUMMARY

Accordingly, it is an object of an embodiment of the present invention to provide a clip which can be used in association with a snap-fit headlamp adjuster so that the headlamp adjuster can be installed with one hand.

Briefly, and in accordance with one or more of the foregoing objects, the present invention provides a clip which is configured to keep a headlamp adjuster together during installation (and preferably also shipping), thereby allowing for one hand, easier installation. The clip can be left on the assembly after installation, or it can be removed, whichever is preferred. The clip is configured such that leaving it in place will not interfere with standard operation of the headlamp adjuster.

Although a specific embodiment is shown and discussed herein, it should be understood that modifications may be made thereto while staying within the scope of the present invention.

BRIEF DESCRIPTION OF THE DRAWINGS

The organization and manner of the structure and function of the invention, together with further objects and advantages thereof, may be understood by reference to the following description taken in connection with the accompanying drawings, wherein like parts are identified with like reference numerals, and wherein.

DESCRIPTION OF ILLUSTRATED EMBODIMENTS

While the present invention may be susceptible to embodiment in different forms, there are shown in the drawings, and herein will be described in detail, embodiments of the invention with the understanding that the present description is to be considered an exemplification of the principles of the invention and is not intended to limit the invention to that as illustrated and described herein.

Figure 2:
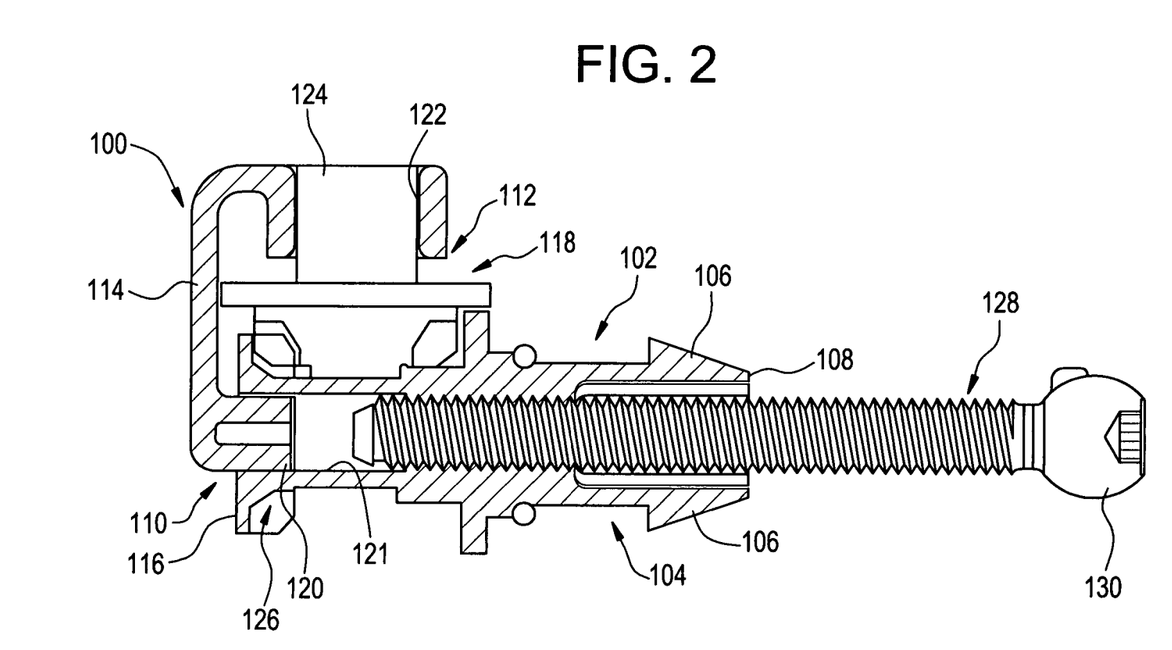
FIG. 2 is a side view, in partial cross-section, of a clip which is in accordance with an embodiment of the present invention, wherein the clip is keeping two sections of a headlamp adjuster together, such as during shipping or installation.
Figure 3:
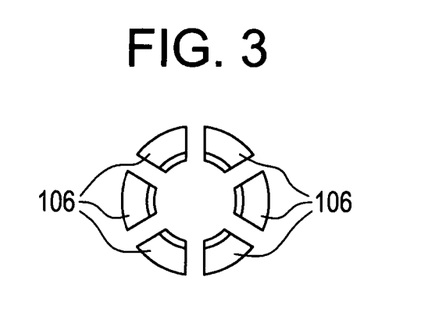
FIG. 3 is a front view of the headlamp adjuster shown in FIG. 2, showing only the fingers which provide the snap-fit arrangement.

As shown in FIG. 2, an embodiment of the present invention provides a clip 100 which is configured to engage a headlamp adjuster 102 and keep the headlamp adjuster 102 together during, for example, shipping or installation. Specifically, the headlamp adjuster 102 may be configured to be mounted in a snap-fit arrangement and engage the reflector 24 of a headlamp assembly 12 (see FIG. 1). To this end, the headlamp adjuster 102 may include a housing 104 which includes fingers 106 at its front end 108 which are configured to facilitate the snap fit engagement. FIG. 3 is a front view of the headlamp adjuster 102 showing only the fingers 106.

Figure 4:
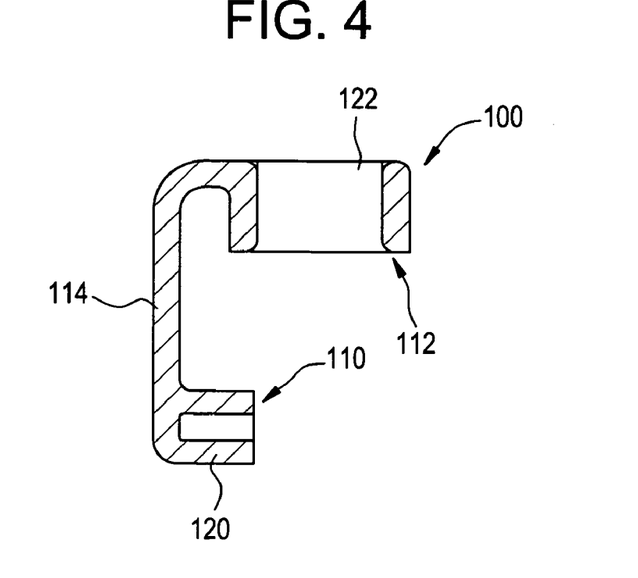
FIG. 4 is a side, cross-sectional view of the clip shown in FIG. 2, showing the clip isolated (i.e., removed from the headlamp adjuster shown in FIG. 2)
Figure 5:
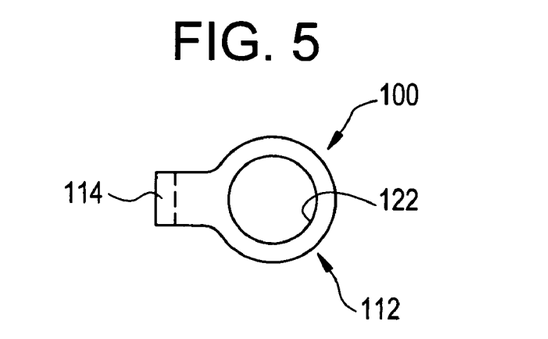
FIG. 5 is a top view of the clip shown in FIG. 4.
Figure 6:
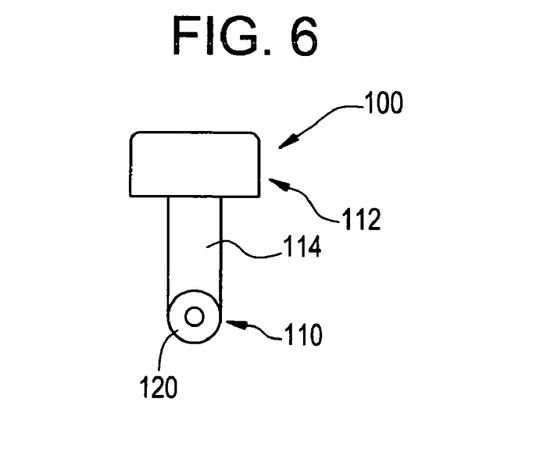
FIG. 6 is a front view of the clip shown in FIG. 4.
Figure 7:
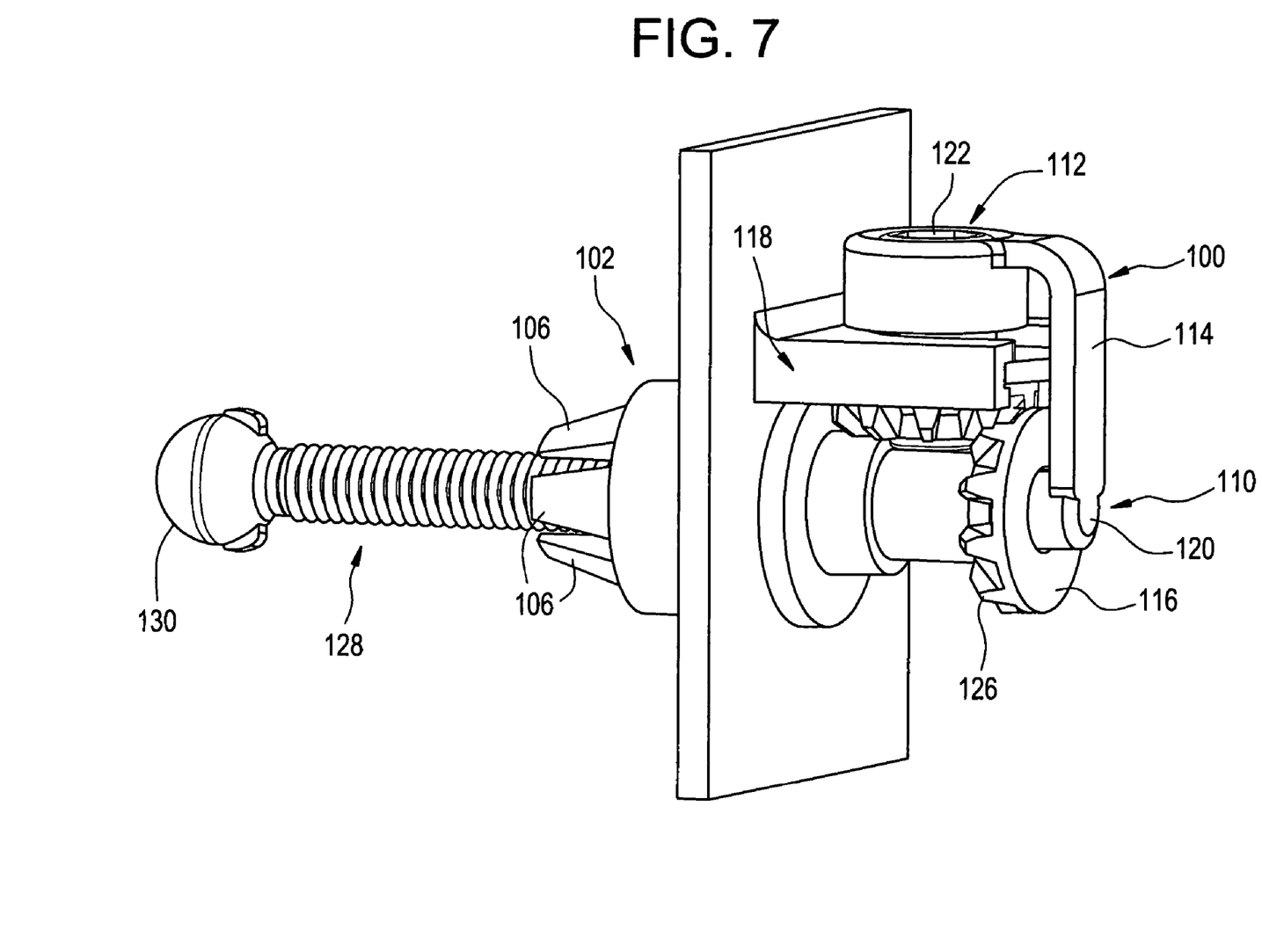
FIGS. 7 and 8 are perspective views of the clip and headlamp adjuster shown in FIG. 2.
Figure 8:
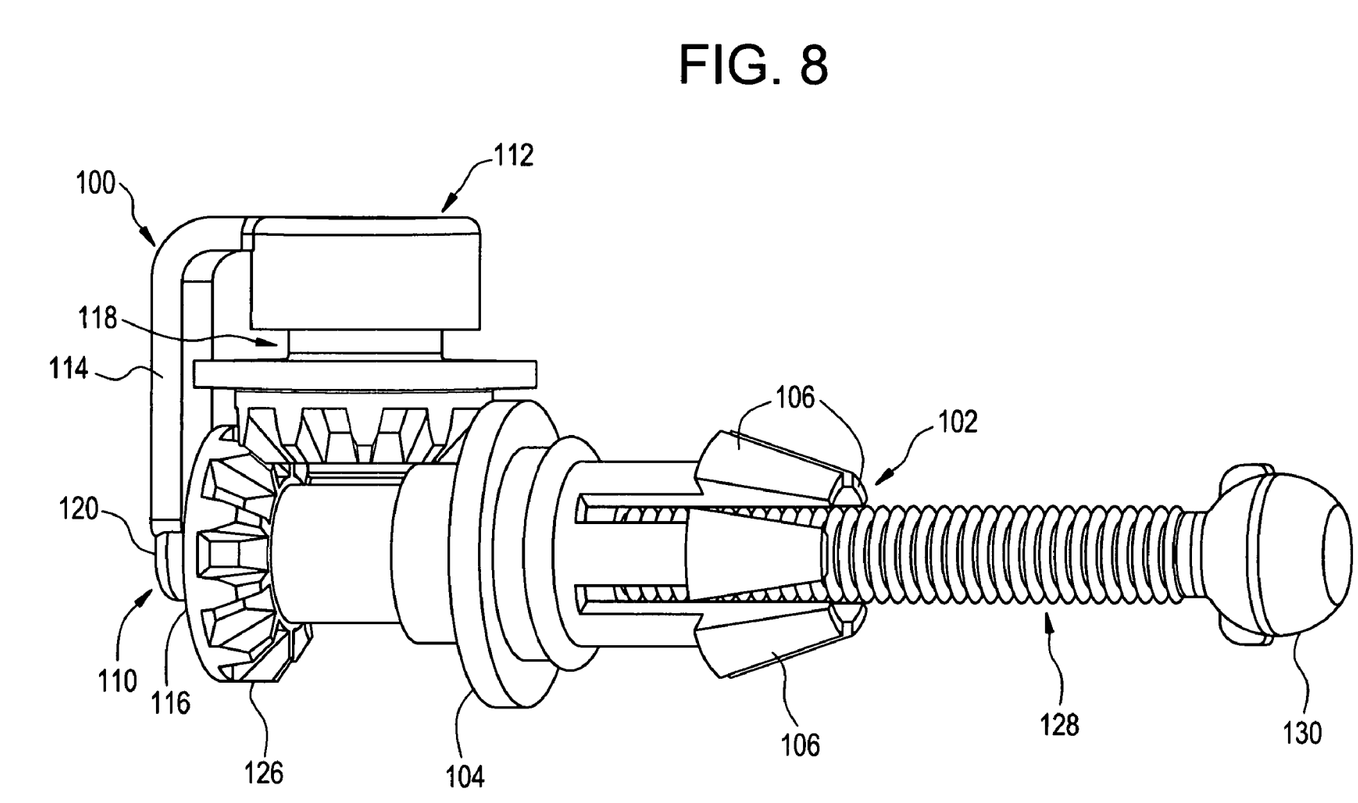
Figure 9:
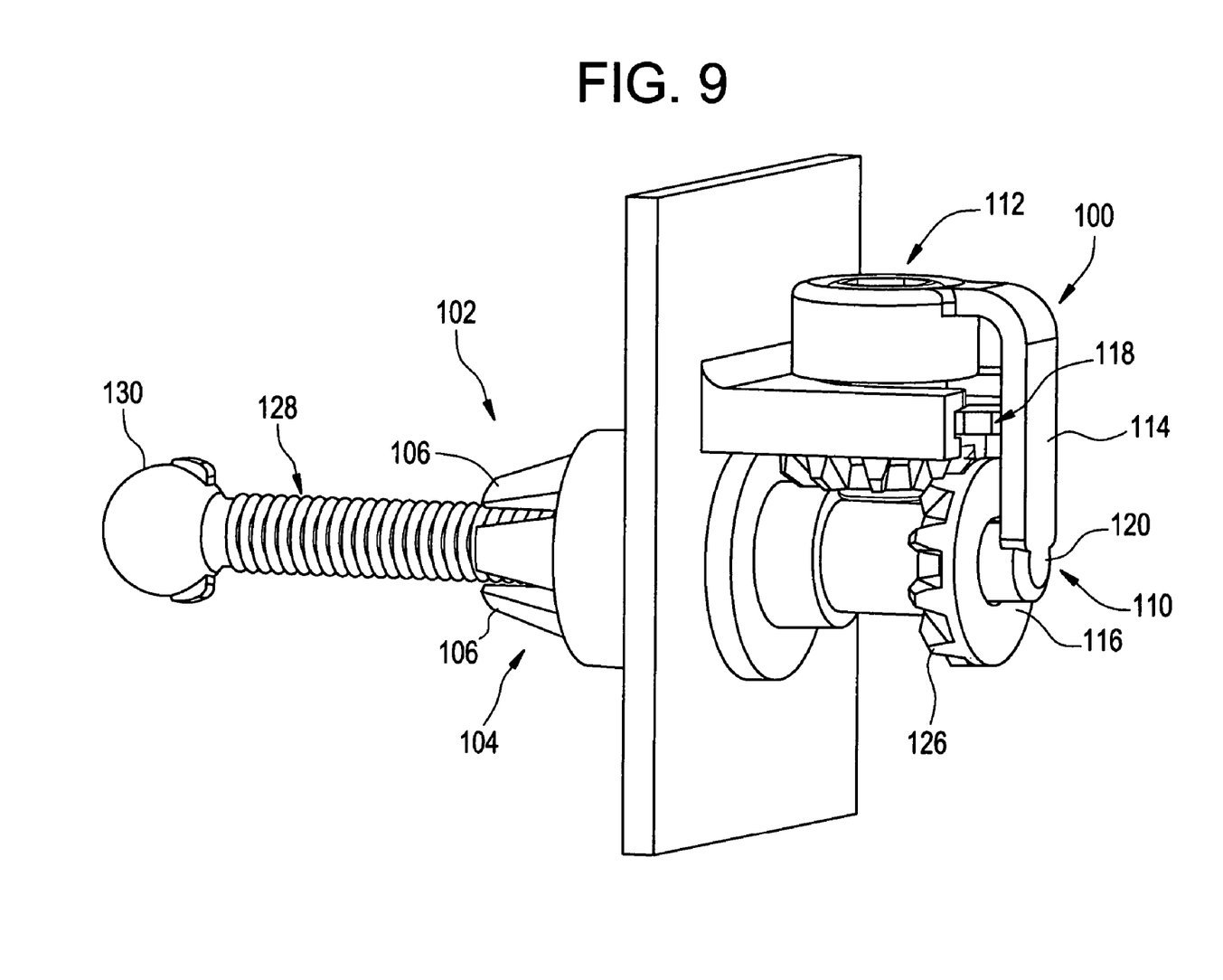
FIG. 9 shows the clip and headlamp adjuster after the headlamp adjuster has been installed.

FIG. 4 is a side, cross-sectional view of the clip 100 isolated (i.e., removed from the headlamp adjuster 102 shown in FIG. 2). FIG. 5 is a top view of the clip 100 and FIG. 6 is a front view. FIGS. 7 and 8 are perspective views of the clip 100 and headlamp adjuster 102 shown in FIG. 2, and FIG. 9 shows the clip 100 and headlamp adjuster 102 after the headlamp adjuster 102 has been installed.

As shown in FIGS. 2, 3 and 7-9, the clip 100 includes a plurality of engagement portions 110, 112 which engage the headlamp adjuster 102 at different points of contact, and an arm portion 114 which extends between the engagement portions 110 and 112. As shown, a preferred embodiment of the clip 100 may provide that two engagement portions 110, 112 are provided—a first engagement portion 110 for engaging an end 116 of the housing 104 of the headlamp adjuster 102, and a second engagement portion 112 for engaging an input gear 118 of the headlamp adjuster 102. Hence, the clip 100 holds two sections of the headlamp adjuster 102 together. Preferably, the first engagement portion 110 has an insertion portion 120 which is configured to fit in an opening 121 (see FIG. 2) in the end 116 of the housing 104 of the headlamp adjuster 102. The second engagement portion 112 includes an aperture 122 which is configured to receive a portion 124 of the input gear 118 of the headlamp adjuster 102. Preferably, the aperture 122 provides that the clip 100 can be kept on the headlamp adjuster 102 after the headlamp adjuster 102 has been installed (see FIG. 9), and the headlamp adjuster 102 can be thereafter operated normally.

As shown in FIG. 2, in addition to the housing 104 and input gear 118, the headlamp adjuster 102 may also include an internal gear 126 which may form part of the housing 104 or at least is in the housing 104 depending on the specific headlamp adjuster design, and an adjuster screw 128 which is engaged with the internal gear 126 and has a ball portion 130 which is configured to engage the reflector 24 of the headlamp assembly 12 (see FIG. 1). Such headlamp adjuster structure is conventional, and the exact structure with which the clip is used is not important to the present invention.

Regardless of the structure of the headlamp adjuster with which the clip is used, preferably the clip is configured to engage a plurality of points on the headlamp adjuster and effectively hold the headlamp adjuster together during installation (and preferably also during shipping), such that the headlamp adjuster can be installed with one hand rather than two. The clip is preferably configured such that it can be left on the assembly after installation, or it can be removed, whichever is preferred. The clip is configured such that leaving it in place will not interfere with standard operation of the headlamp adjuster.

Figure 10:
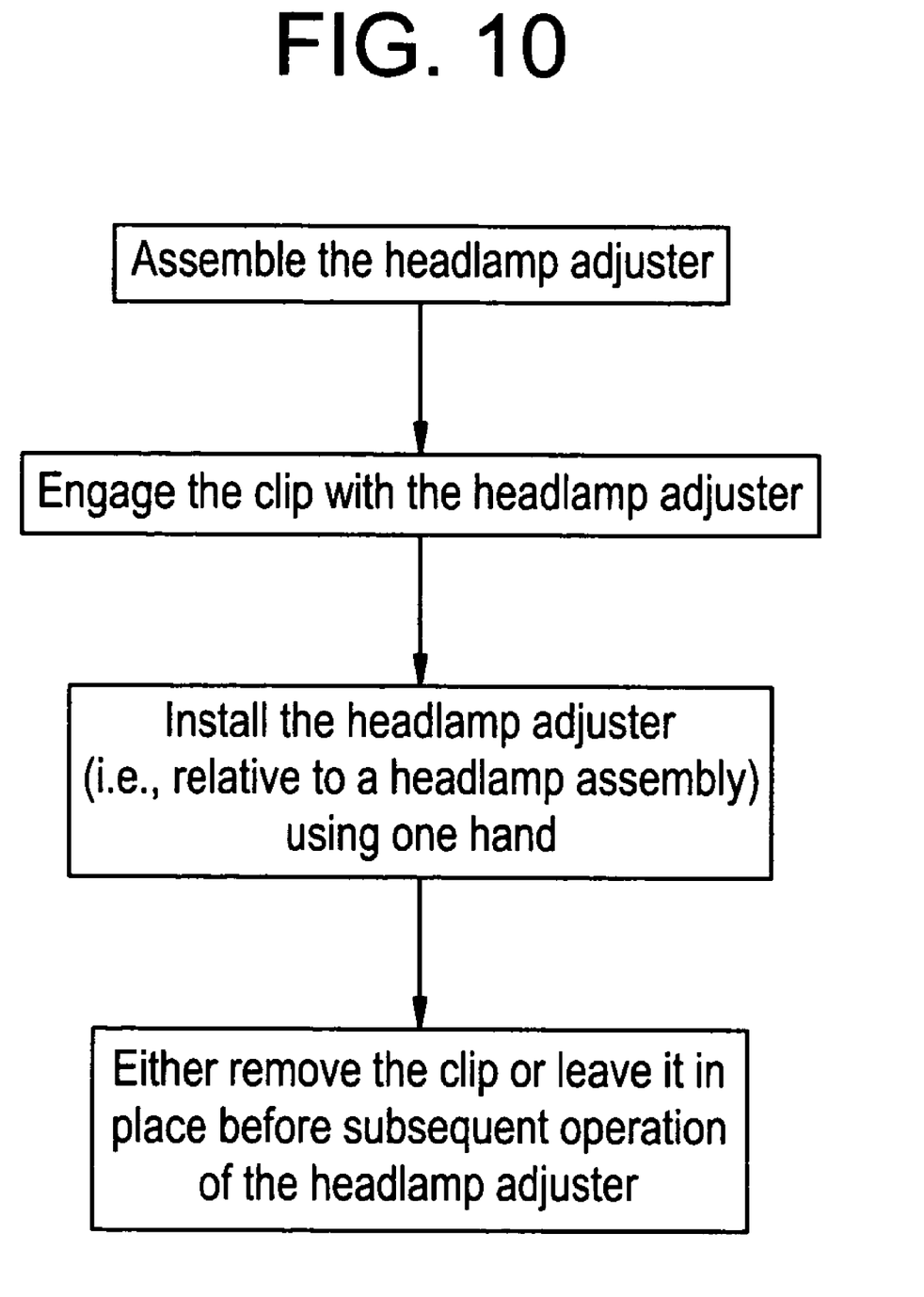
FIG. 10 is a flow chart of a method of installing a headlamp adjuster, where the method is in accordance with an embodiment of the present invention.

FIG. 10 is a flow chart of a method of installing a headlamp adjuster, where the method is in accordance with an embodiment of the present invention. As shown, the method provides that the headlamp adjuster is assembled, and then a clip such as is shown in FIGS. 2-9 is engaged with the headlamp adjuster, such that the clip keeps the headlamp adjuster together. Finally, the headlamp adjuster is installed using one hand. Thereafter, the clip may be removed or may remain engaged with the headlamp adjuster, as the clip is configured such that leaving it in place will not interfere with standard operation of the headlamp adjuster.

Figure 11:
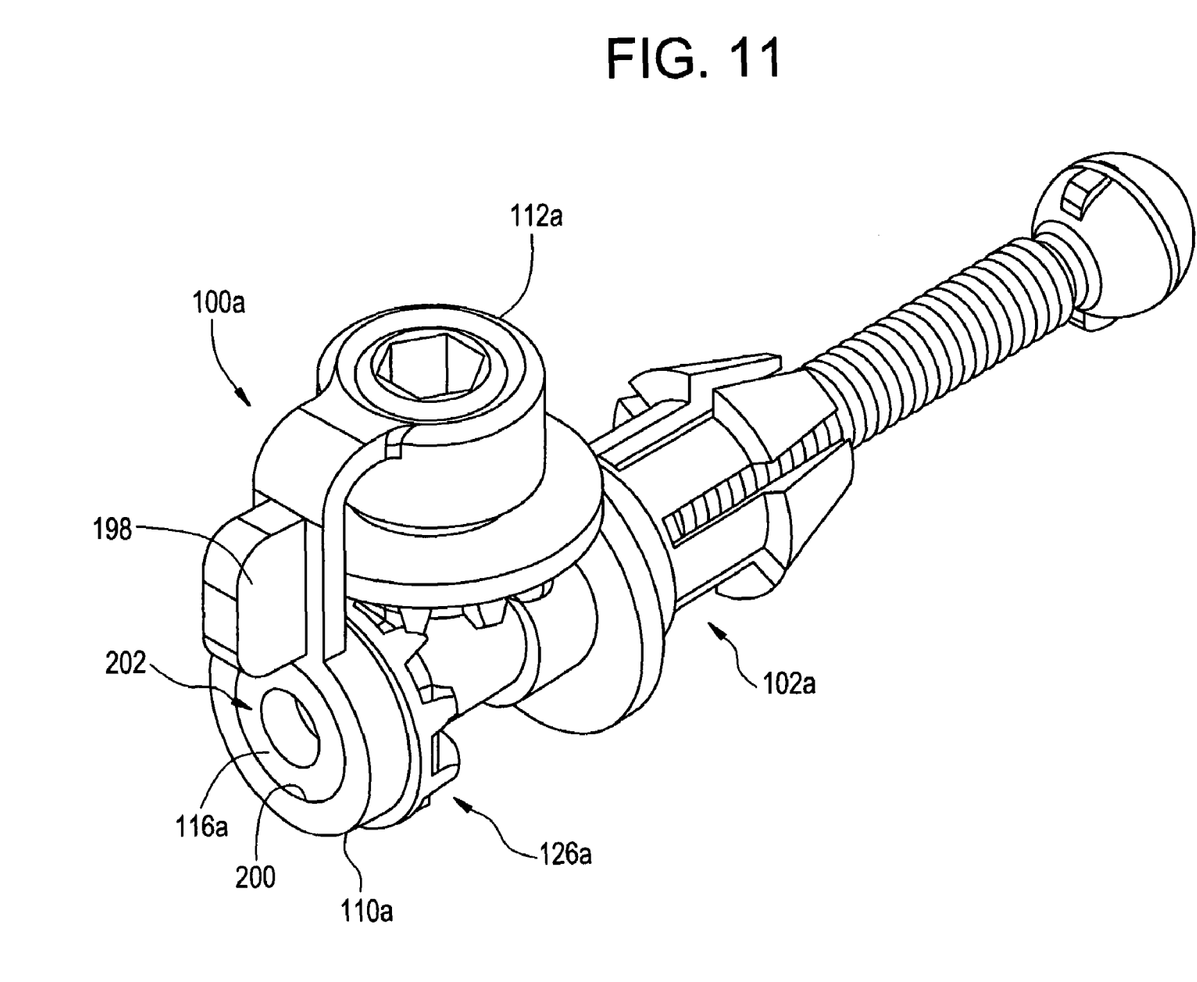
FIG. 11 is a perspective view of a clip which is in accordance with an alternative embodiment of the present invention, wherein the clip is keeping two sections of a headlamp adjuster together, such as during shipping or installation.

FIG. 11 is a perspective view of a clip 100a which is in accordance with an alternative embodiment of the present invention. The clip 100a is very similar to the clip 100 which is shown in FIGS. 2 and 4-9, the only differences being that the clip 100a shown in FIG. 11 includes a protrusion 198 to facilitate gripping the clip 100a during installation of the headlamp adjuster 102a, and the engagement portion 110a of the clip 100a includes an aperture 200 (rather than an insertion portion 120 as shown in FIG. 2) configured to receive a protrusion 202 provided at the end 116a of the headlamp adjuster 102a, on the gear 126a. With regard to the other engagement portion 112a, the structure and configuration may be identical to the engagement portion 112 of the clip 100 previously described. Additionally, the headlamp adjuster 102a may be the same as headlamp adjuster 102 previously described, with the exception that gear 126a includes a protrusion 202 rather than an opening 121 (see FIG. 2). Much like clip 100, clip 100a is configured to keep the headlamp adjuster 102a together, such as during shipping or installation, and is configured to not interfere with normal operation of the headlamp adjuster 102a should the clip 100a be left on after installation.

While embodiments of the present invention are shown and described, it is envisioned that those skilled in the art may devise various modifications without departing from the spirit and scope of the foregoing description.

What is claimed is:

1. A clip which is configured to keep a headlamp adjuster together, said clip configured to provide that the headlamp adjuster is installable with one hand holding the clip, wherein the clip comprises a first engagement portion configured to engage an end of a housing of the headlamp adjuster without engaging an adjuster screw of the headlamp adjuster, and a second engagement portion connected to the first engagement portion and configured to engage an input gear of the headlamp adjuster, wherein the clip is engaged with the headlamp adjuster such that a position of the clip is not adjustable relative to the end of the housing of the headlamp adjuster.

2. A clip as recited in claim 1, wherein said clip is configured to be left on the headlamp adjuster after installation, wherein said clip is configured not to interfere with subsequent standard operation of the headlamp adjuster.

3. A clip as recited in claim 1, further comprising an arm portion which extends between the first and second engagement portions.

4. A clip as recited in claim 1, wherein the first engagement portion comprises an insertion portion which is configured to fit in an opening in the end of the housing of the headlamp adjuster.

5. A clip as recited in claim 1, wherein the first engagement portion includes an aperture which is configured to receive a protrusion proximate the end of the headlamp adjuster without engaging the adjuster screw.

6. A clip as recited in claim 1, wherein the second engagement portion includes a circular-shaped aperture which is configured to receive a portion of the input gear of the headlamp adjuster.

7. A clip as recited in claim 6, wherein the aperture is configured to provide that the clip can be kept on the headlamp adjuster after the headlamp adjuster has been installed, and the headlamp adjuster can be thereafter operated normally without obstruction from the clip.

8. A clip as recited in claim 1, wherein the first engagement portion comprises an insertion portion which is configured to fit in an opening in the end of the housing of the headlamp adjuster, and wherein the second engagement portion includes a circular-shaped aperture which is configured to receive a portion of the input gear of the headlamp adjuster.

9. A clip as recited in claim 1, wherein the end of the housing with which the first engagement portion of the clip is configured to engage is a rear end of the housing, opposite a ball portion of the adjuster screw of the headlamp adjuster.

10. A method of installing a headlamp adjuster comprising: assembling a headlamp adjuster which is configured to remain intact without having to be engaged with a clip; engaging the clip with the headlamp adjuster; holding the clip to install the headlamp adjuster using one hand; and further comprising removing the clip and thereafter operating the headlamp adjuster.

11. A method as recited in claim 10, wherein the step of engaging the clip with the headlamp adjuster comprises engaging a first engagement portion of the clip with an end of a housing of the headlamp adjuster, and engaging a second engagement portion of the clip with an input gear of the headlamp adjuster.

12. A method as recited in claim 11, further comprising providing that the clip comprises an arm portion which extends between the first and second engagement portions.

13. A method as recited in claim 11, further comprising inserting an insertion portion of the first engagement portion of the clip in an opening in the end of the housing of the headlamp adjuster.

14. A method as recited in claim 11, further comprising providing that the first engagement portion of the clip includes an aperture, and having the aperture receive a protrusion proximate the end of the headlamp adjuster.

15. A method as recited in claim 11, further comprising providing that the second engagement portion of the clip includes an aperture, and having the aperture receive a portion of the input gear of the headlamp adjuster.

16. A method of installing a headlamp adjuster comprising: assembling a headlamp adjuster which is configured to remain intact without having to be engaged with a clip; engaging a first engagement portion of the clip with an end of a housing of the headlamp adjuster without engaging an adjuster screw of the headlamp adjuster; engaging a second engagement portion of the clip with an input gear of the headlamp adjuster, wherein the second engagement portion is connected to the first engagement portion, and wherein the clip is engaged with the headlamp adjuster such that a position of the clip is not adjustable relative to the end of the housing of the headlamp adjuster; and holding the clip to install the headlamp adjuster using one hand.

17. A method as recited in claim 16, further comprising leaving the clip on the headlamp adjuster after installation, wherein said clip is configured not to interfere with subsequent standard operation of the headlamp adjuster.

18. A method as recited in claim 16, further comprising providing that the clip comprises an arm portion which extends between the first and second engagement portions.

19. A method as recited in claim 16, further comprising inserting an insertion portion of the first engagement portion of the clip in an opening in the end of the housing of the headlamp adjuster.

20. A method as recited in claim 16, further comprising providing that the first engagement portion of the clip includes an aperture, and having the aperture receive a protrusion proximate the end of the headlamp adjuster without engaging the adjuster screw.

21. A method as recited in claim 16, further comprising providing that the second engagement portion of the clip includes a circular-shaped aperture, and having the aperture receive a portion of the input gear of the headlamp adjuster.

22. A method as recited in claim 16, further comprising providing that the end of the housing with which the first engagement portion of the clip is configured to engage is a rear end of the housing, opposite a ball portion of the adjuster screw of the headlamp adjuster.

* * * * *